US012800131B2

(12) United States Patent
Horaczek

(10) Patent No.: US 12,800,131 B2
(45) Date of Patent: Nov. 17, 2026

(54) LUMINAIRE ASSEMBLY AND CLAMPING ELEMENT FOR LUMINAIRE ASSEMBLY

(71) Applicant: SIGNIFY HOLDING B.V., Eindhoven (NL)

(72) Inventor: Michal Jan Horaczek, Best (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/156,085

(22) PCT Filed: Feb. 5, 2024

(86) PCT No.: PCT/EP2024/052770
§ 371 (c)(1),
(2) Date: Aug. 13, 2025

(87) PCT Pub. No.: WO2024/170322
PCT Pub. Date: Aug. 22, 2024

(65) Prior Publication Data

US 2026/0235279 A1 Aug. 13, 2026

(30) Foreign Application Priority Data

Feb. 13, 2023 (EP) .................................... 23156234

(51) Int. Cl.

| | |
|---|---|
| ***F21V 17/16*** | (2006.01) |
| ***F16F 1/02*** | (2006.01) |
| ***F16F 3/02*** | (2006.01) |
| *B33Y 80/00* | (2015.01) |

(52) U.S. Cl.
CPC ............ *F21V 17/162* (2013.01); *F16F 1/027* (2013.01); *F16F 3/023* (2013.01); *B33Y 80/00* (2014.12)

(58) Field of Classification Search
CPC ........ F21V 17/162; F21V 17/16; F21V 17/10; F21V 17/00; F21V 21/04; F21V 21/042; F21V 21/044; F21V 21/088; F16F 1/027; F16F 3/023; B33Y 80/00
See application file for complete search history.

(56) References Cited

U.S. PATENT DOCUMENTS

| | | | | |
|---|---|---|---|---|
| 9,188,319 | B2 * | 11/2015 | Nakagawa .............. | F21V 21/14 |
| 2009/0295986 | A1 | 12/2009 | Topliss et al. | |
| 2012/0160091 | A1 | 6/2012 | Dadd et al. | |

(Continued)

FOREIGN PATENT DOCUMENTS

| | | | |
|---|---|---|---|
| CN | 101169237 | A | 4/2008 |
| CN | 208546860 | U | 2/2019 |

(Continued)

*Primary Examiner* — Bao Q Truong

(57) ABSTRACT

A clamping element for clamping a luminaire assembly, comprising an inner section, a peripheral section, and an annular flexure section bridging the inner section and the peripheral section. The annular flexure structure allows elastic displacement of the inner section such that the flexure section, when extended, causes a clamping force between the inner and peripheral sections. The clamping element may thus be manufactured as a flat element, and in use be extended to desired height creating a biasing spring force. Thereby, one single clamping element may be used for a range of different stacks with different clamping height.

15 Claims, 7 Drawing Sheets

(56) References Cited

U.S. PATENT DOCUMENTS

| | | | | |
|---|---|---|---|---|
| 2014/0078734 | A1* | 3/2014 | Nakagawa | F21V 21/14 362/235 |
| 2020/0400292 | A1* | 12/2020 | Elmvang | F21V 21/14 |
| 2022/0299194 | A1 | 9/2022 | Huang et al. | |

FOREIGN PATENT DOCUMENTS

| | | | |
|---|---|---|---|
| EP | 2322847 | A2 | 5/2011 |
| EP | 2716968 | A1 | 4/2014 |

* cited by examiner

--Prior Art--

--Prior Art--

LUMINAIRE ASSEMBLY AND CLAMPING ELEMENT FOR LUMINAIRE ASSEMBLY

CROSS-REFERENCE TO PRIOR APPLICATIONS

This application is the U.S. National Phase application under 35 U.S.C. § 371 of International Application No. PCT/EP2024/052770, filed on Feb. 5, 2024, which claims the benefit of European Patent Application No. 23156234.9, filed on Feb. 13, 2023. These applications are hereby incorporated by reference herein.

FIELD OF THE INVENTION

The present invention relates to a clamping element for a luminaire assembly, in particular for a reflector assembly e.g. for a downlight.

BACKGROUND OF THE INVENTION

Many luminaires, e.g. downlights, include a stack of components such as a heatsink, a diffusor, a reflector and a front rim. The stack is held together by a rigid clamping element. The clamping height of the stack may be different for different types of luminaires, e.g. different downlights. For example, a specific downlight may be manufactured in several different variants having different reflector height. A different clamping element is required for each clamping height. Also, manufacturing tolerances of the components in the stack result in slightly different stack height, even for the same variant. As a result, the clamping element may not fit the stack perfectly.

GENERAL DISCLOSURE OF THE INVENTION

It is an object of the invention to overcome, or mitigate, the discussed challenges. The invention is set out in the set of appended claims. Specifically, it is an object to provide a luminaire assembly and a clamping element which is capable of clamping luminaire assemblies having different clamping height.

This and other objects are achieved by a luminaire assembly comprising a set of components arranged in a stack along a central axis, a clamping element for clamping the stack of components in the luminaire assembly, the clamping element comprising an inner section, a peripheral section, co-planar with and surrounding the inner section, and an annular flexure section bridging the inner section and the peripheral section, the annular flexure structure allowing an elastic displacement of the inner section with respect to the peripheral section in a direction normal to a planar extension of the peripheral section, such that, when the inner section is separated from the peripheral section in the direction, the flexure section causes a clamping force between the inner and peripheral sections.

The clamping element may thus be manufactured as a flat element, with the annular flexure section in an unexpanded state. In use, the flexure section is extended to desired height creating a biasing spring force (clamping force). Thereby, one single clamping element may be used for a range of different stacks with different clamping height. This reduces the number of parts—and consequently machining tools and storage capacity) required for a given luminaire product portfolio. Also, implementations of the present invention can absorb variations in stack height due to manufacturing tolerances.

The unexpanded (flat) clamping element can be placed on the upper surface of the luminaire assembly stack, and the peripheral section is then pushed down over the stack, while extending/expanding the annular flexure section to an expanded state. The peripheral section is then attached to the outer element of the stack, thereby ensuring a clamping force across the assembly.

The annular section may be circular, which is convenient for many luminaire assembly geometries. However, the annular section may alternatively have any other shape, such as oblong, oval, or rectangular.

The flexure section may include a set of spirally arranged flexible elements, such that the flexure section in its expanded state resembles a spiral. Alternatively, the flexure section includes a set of meander elements, i.e. zig-zag shaped flexure elements, each comprising two legs with opposite orientation, arranged adjacent each other around the circumference of the annular flexure section. When the flexure section is expanded, each meander section will expand into an extended zig-zag shape such that the individual rotational effects of the legs will mutually cancel if they are both expanded.

The inner section has an outer perimeter that matches the inner boundary of the annular section, but may otherwise have any shape. For example, it may completely fill the area inside the annular flexure section. Alternatively, it is has one or several openings, e.g. to match a design of the luminaire assembly.

In one embodiment, the inner section is ring-shaped, with a central opening. The ring typically has a shape matching the shape of the annular flexure section. So, for example a circular ring in case of a circular annular flexure section.

Also the peripheral section may be ring-shaped, and have an inner perimeter matching the outer boundary of the annular section.

The clamping element may advantageously be formed as a flat element made in one integral piece. For example, the flat element may be formed of a sheet material, e.g. sheet metal or plastic, using any suitable technique, including punching, stamping, laser cutting, water cutting. Alternatively, the flat element can be formed by etching, injection molding, vacuum casting, etc.

In some embodiments, the clamping element is made from more than one independent part, and/or of more than one material. For example, the inner and peripheral section may be made of one material, while the flexure section is made of a second material. The different sections are then attached to each other using adhesive, welding, heat staking, overmolding, or other appropriate techniques.

Using different pieces/materials may be advantageous if the inner and peripheral sections need to be structurally strong, while a relatively soft flexure structure is required. For example, a plastic flexure structure may be attached between two metal rings. Different materials may also be advantageous to avoid (or promote) heat dissipation. For example, with a plastic flexure section between two metal sections, the inner section may contribute to heat dissipation, while heat is not conducted to the peripheral section.

As yet another alternative, the flat element may be 3D printed using one or several 3D printing materials.

In some embodiments, the annular flexure section includes a first annular flexure section and a second annular flexure section, and an intermediate section between said first and second annular flexure sections. The first annular flexure section is oriented oppositely to the second annular flexure section, such that the individual rotational effects of the first and second annular flexure section will mutually cancel if they are both expanded. The clamping element can then be expanded in two stages. This means that one clamping element may be used in different applications (multi-purpose clamping element). It also means that one single clamping element may apply a clamping force on two levels (multi-level clamping element).

BRIEF DESCRIPTION OF THE DRAWINGS

The present invention will be described in more detail with reference to the appended schematic drawings, showing currently preferred embodiments of the invention.

DETAILED DESCRIPTION OF PREFERRED EMBODIMENTS

Figure 1:
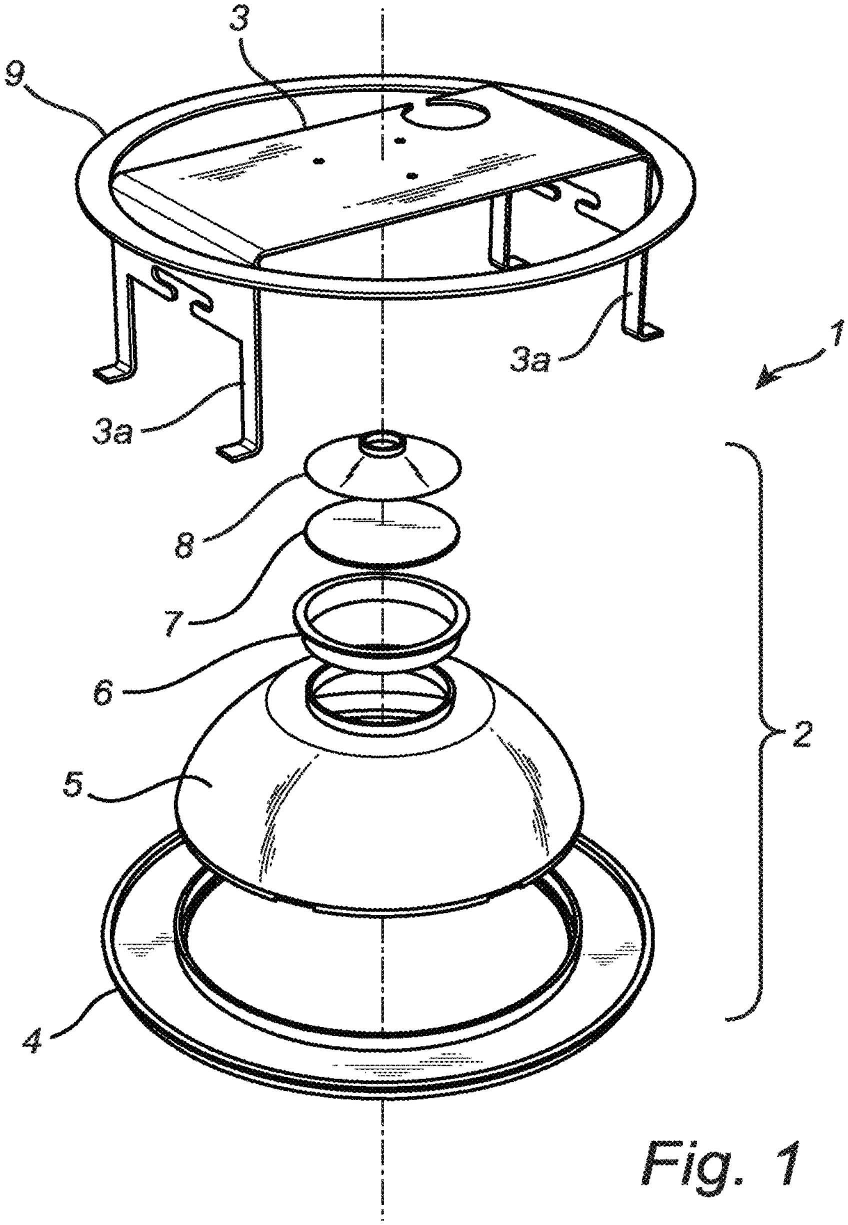
FIG. 1 shows an exploded view of luminaire assembly with a clamping element according to prior art.
Figure 2:
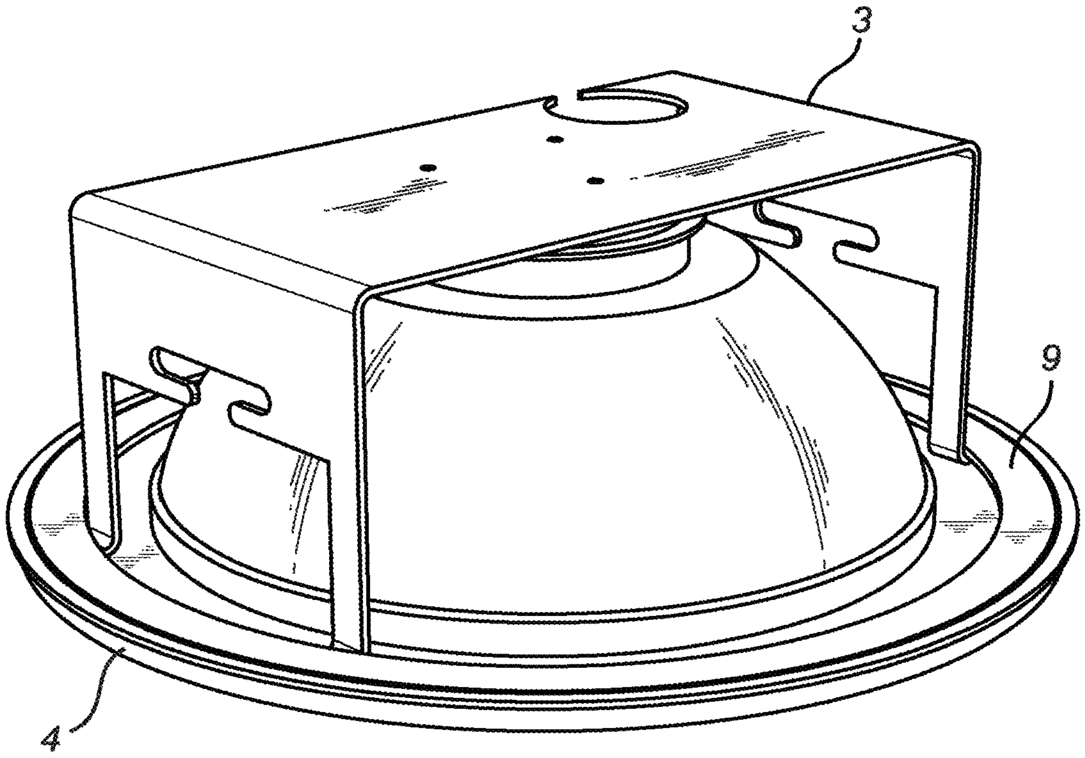
FIG. 2 shows a perspective view of the luminaire assembly in FIG. 1.

The luminaire assembly 1 shown in FIGS. 1-2 comprises a stack 2 of components held together by a heat sink serving as a rigid clamping element 3. The stack 2 here includes a front rim 4, a reflector 5, a diffusor holder 6, a diffusor 7, and a light mixing box 8. The clamping element 3 is arranged on top of the stack, so that the sides 3*a* of the clamping element rest on the front rim 4. A weld ring 9 is arranged over the camping element 3, and is welded to the front rim 4, thereby fixating the assembly 1 (see FIG. 2). It is clear from FIGS. 1-2 that the rigid clamping element 3 must be precisely adapted for the specific height of the stack 2. If the sides 3*a* of the clamping element are too short, the clamping element will not reach the front rim and cannot be welded to it. If the sides 3*a* of the clamping element are too long, the various components 3-8 of the stack 2 will not be fixated (clamped) by the clamping element 3.

Figure 3:
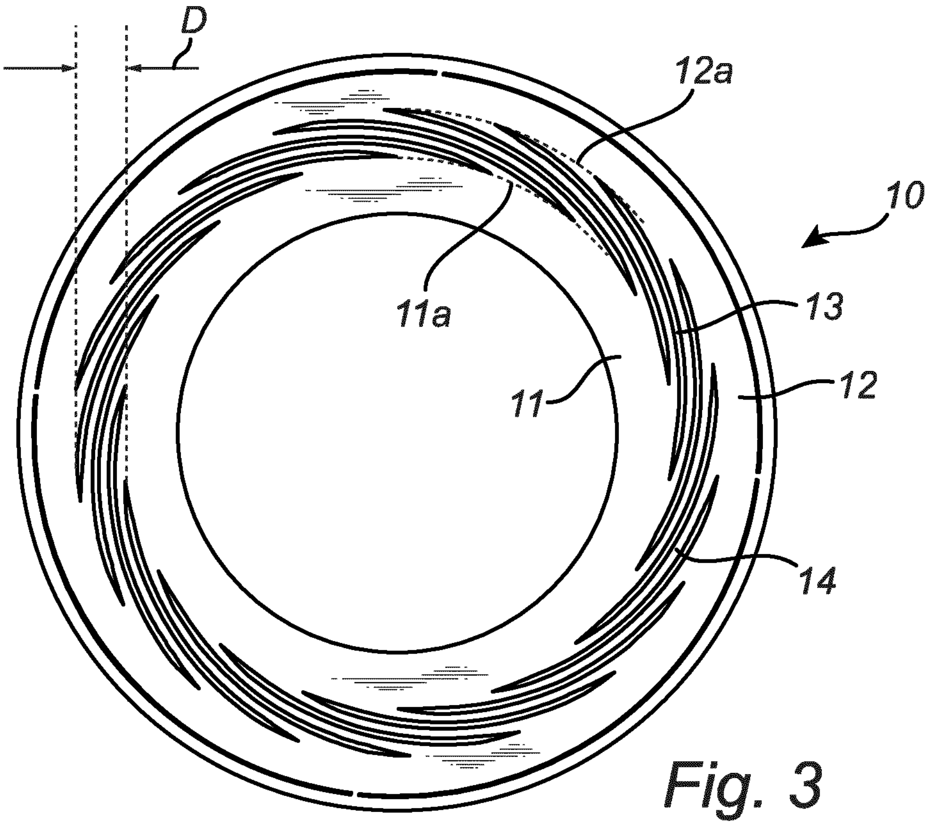
FIG. 3 shows a top view of a clamping element according to an embodiment of the present invention.

Turning to FIG. 3, a clamping element 10 according to an embodiment of the invention includes an inner section 11, a peripheral section 12, co-planar with and surrounding the inner section 11, and an annular flexure section 13 bridging the inner section 11 and the peripheral section 12. The clamping element 10 here has a circular shape, so that the inner section 11, the outer section 13 and the annular flexure section 13 are all circular rings. Many other shapes are possible. However, it is preferable that the width D of the annular flexure section is relatively constant all around the clamping element 10, i.e. that the contour of the outer perimeter 11*a* of the inner section 11 substantially matches the contour of the inner perimeter 12*a* of the outer section 12. The annular flexure section 13 comprises a plurality of flexures 14, in the illustrated example formed as windings of a spiral.

In order to achieve the desired properties, the clamping element provides several useful design parameters. The width D of the flexure section 13 will determine the maximum clamping height for a given flexure design. A larger width t (see FIG. 5) of individual flexures 14 will increase clamping force and reduce the clamping range in given width D. Further, the thickness h (see FIG. 5) of the individual flexures 14 will determine the clamping force (at a given clamping height).

In FIG. 3, the clamping element 10 is in a flat, non-expanded state, which is typically how the clamping element is manufactured. The material of the clamping element is chosen such that the clamping element, and in particular the annular flexure section 13, is flexible, so that it allows an elastic displacement of the inner section 11 with respect to the peripheral section 12 in a direction normal to the planar extension of the element 10. In this expanded (extended) state, when the inner section is separated from the peripheral section, the flexure section 13 causes an attracting (clamping) force between the inner section 11 and peripheral section 12.

The clamping element 10 may be stamped or pressed or cut (e.g. by laser or water jet) from a piece of sheet material, e.g. plastic or metal. As mentioned above, also many other manufacturing methods may be used, including assembly of several independent parts, or use of several different materials. Alternatively, the clamping element may be 3D printed using a plastic or metal printing material. There are also 3D printing techniques allowing use of several materials, so that some parts of the clamping element are printed in metal, and other parts in plastic.

Figure 4:
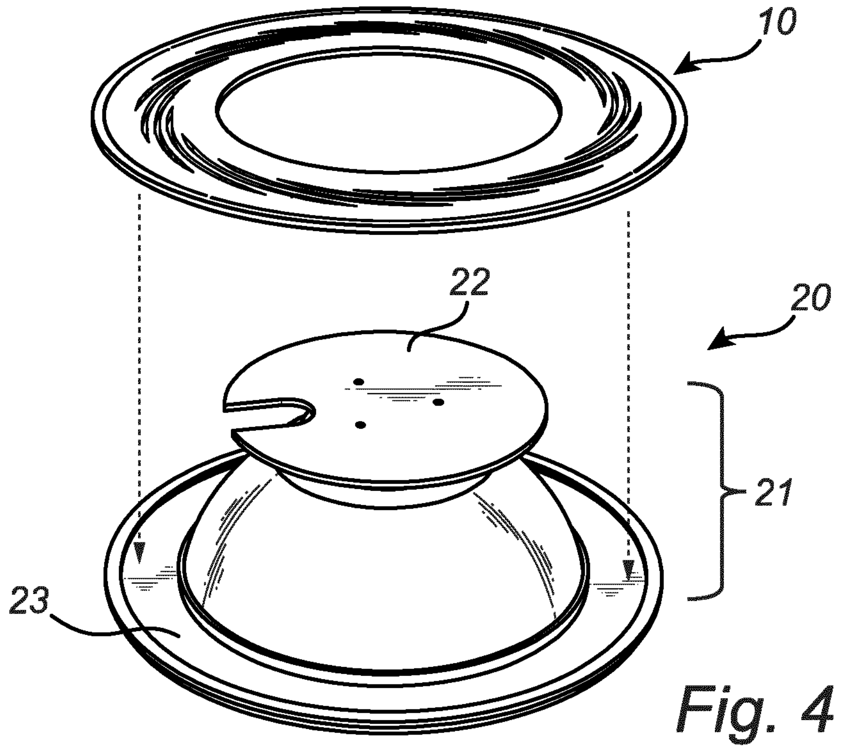
FIG. 4 shows an exploded view of luminaire assembly with a clamping element according to an embodiment of the present invention.
Figure 5:
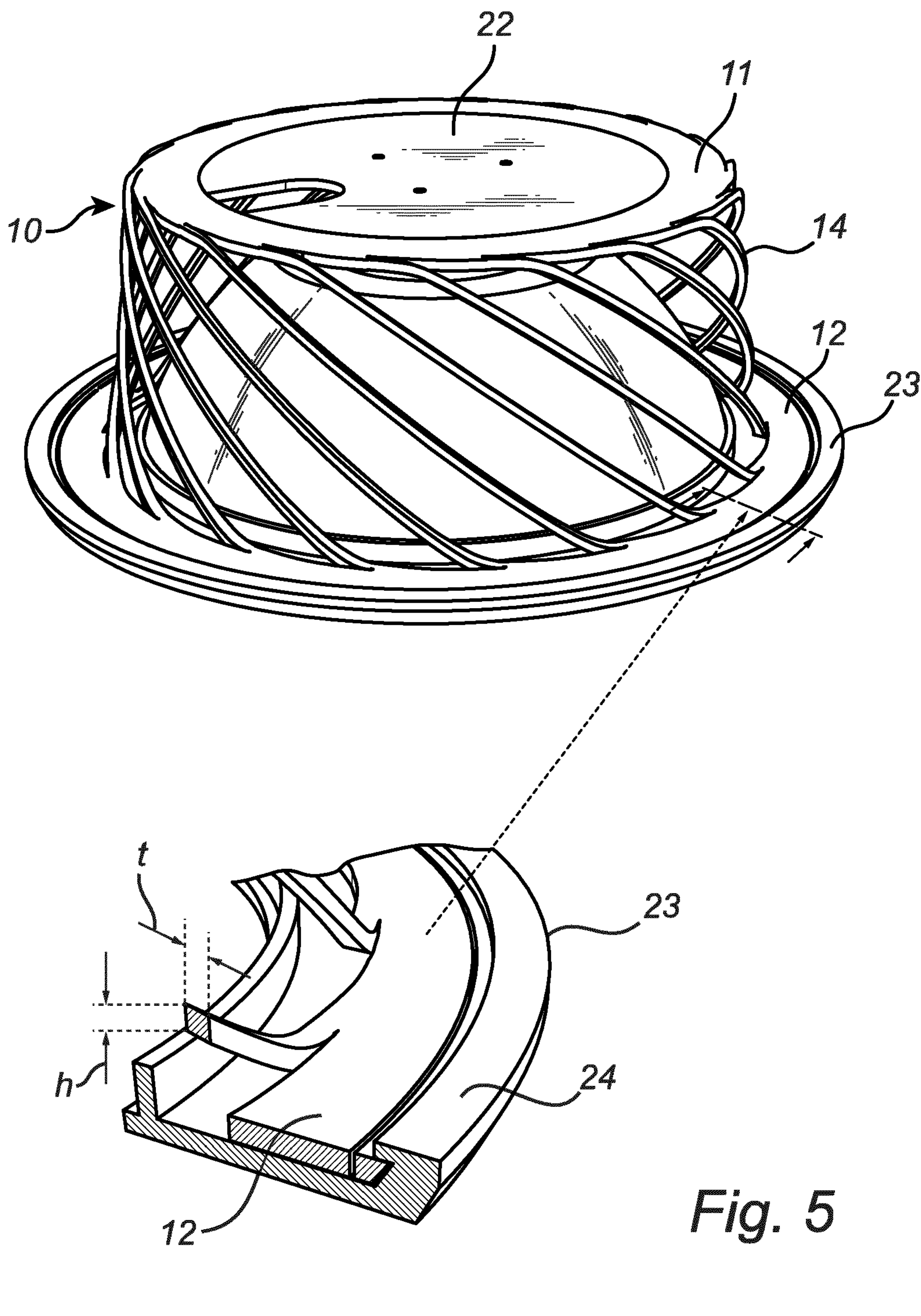
FIG. 5 shows a perspective view of the luminaire assembly in FIG. 4.

Turning to FIGS. 4-5, there is shown a luminaire assembly 20, where the clamping element 10 is arranged to clamp a stack 21 of components. The components may be the same or similar to those in FIG. 1-2. In the illustrated example, a heat sink 22 in the form of a disc having a diameter slightly larger than the opening in the inner section 11 is arranged on the top of the stack 21. The clamping element 10, in its flat, unexpanded state, is then placed on top of the heat sink 22, and the peripheral section 12 is pushed down towards the front rim 23 and is attached thereto. In this expanded state, shown in FIG. 5, the flexure section 13 will provide a clamping force to secure the stack 21.

It is noted that the inner section 11 of the clamping element 10 may alternatively be filled, such that the heat sink 22 is no longer required. However, it may be more cost efficient to manufacture a separate end plate, as shown in FIGS. 4-5. For example, while it may be beneficial to 3D-print a complex structure like the flexure section 13, there may be more cost-efficient ways to manufacture a simple structure like the heat sink 22.

As illustrated in the enlargement of FIG. 5, the front rim 23 is here provided with a snap-in structure 24, in which the peripheral section 12 may be snap-fitted in. Such snap-fitting may provide a temporary fixation of the clamping element, before it is permanently fixated using e.g. welding.

Figure 6A:
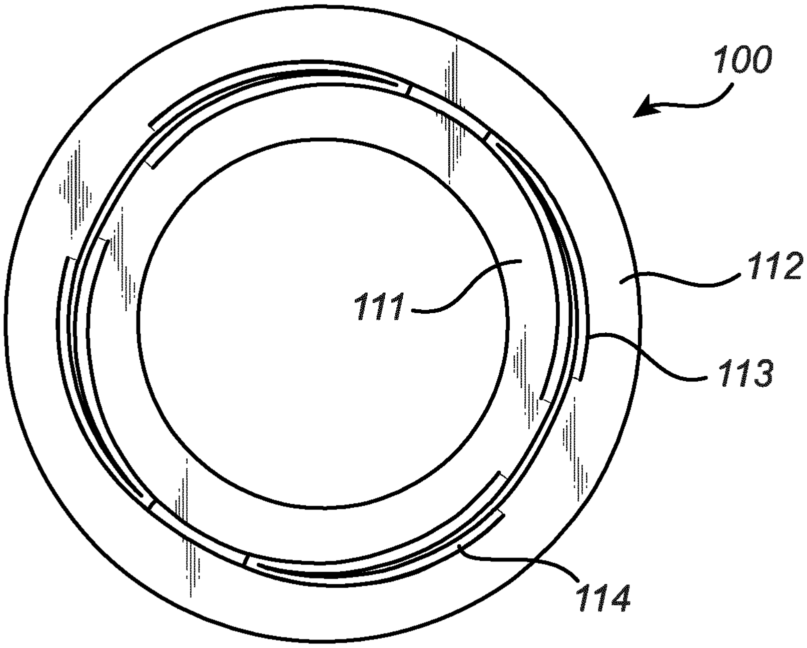
FIG. 6*a* shows a top view of a clamping element according to another embodiment of the present invention.
Figure 6B:
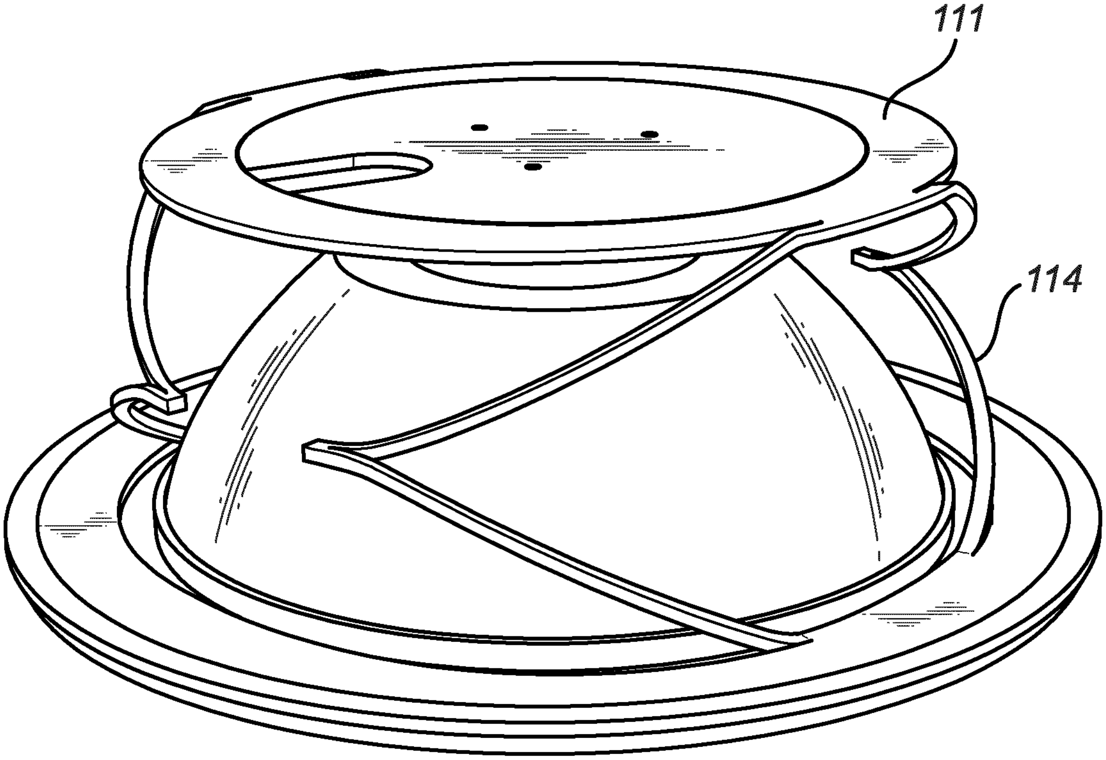
FIG. 6*b* shows a perspective view of luminaire assembly with the clamping element in FIG. 6*a*.

In the embodiment in FIG. 6*a-b,* the clamping element 100 again has an inner section 111, a peripheral section 112, and an intermediate flexure section 113 with multiple flexure elements 114. In this case, the flexure elements 114 are meander-shaped. In its expanded state, illustrated in FIG. 6*b*, each flexure element 114 will have a zig-zag shape. The clamping device 100 in FIGS. 6*a*-6*b* may be applied and fixated in a similar way as discussed with reference to FIGS. 4-5.

It is noted that the clamping element 10 in FIG. 3 (spiral flexures 14) will exhibit a slight rotation between the inner and peripheral sections as the clamping element is expanded. The clamping element 100 in FIG. 6*a*, on the other hand, will not exhibit any such rotation, as the meander flexure elements 114 have two legs with opposite orientation.

Figure 7A:
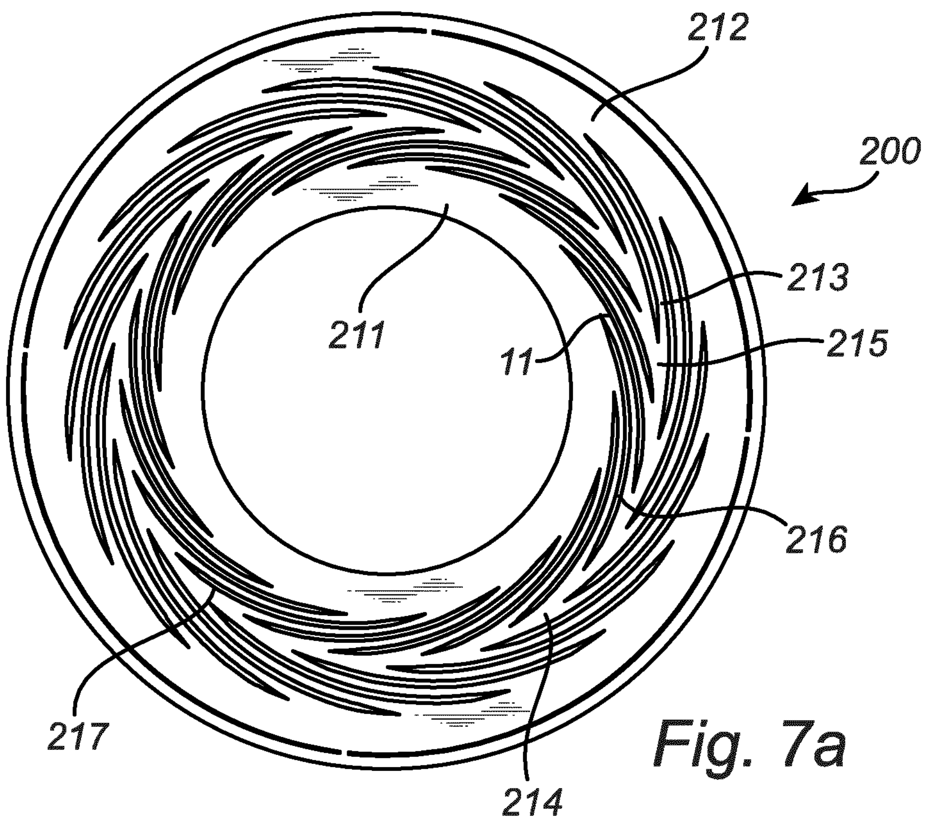
FIG. 7*a* shows a top view of a clamping element according to another embodiment of the present invention.
Figure 7B:
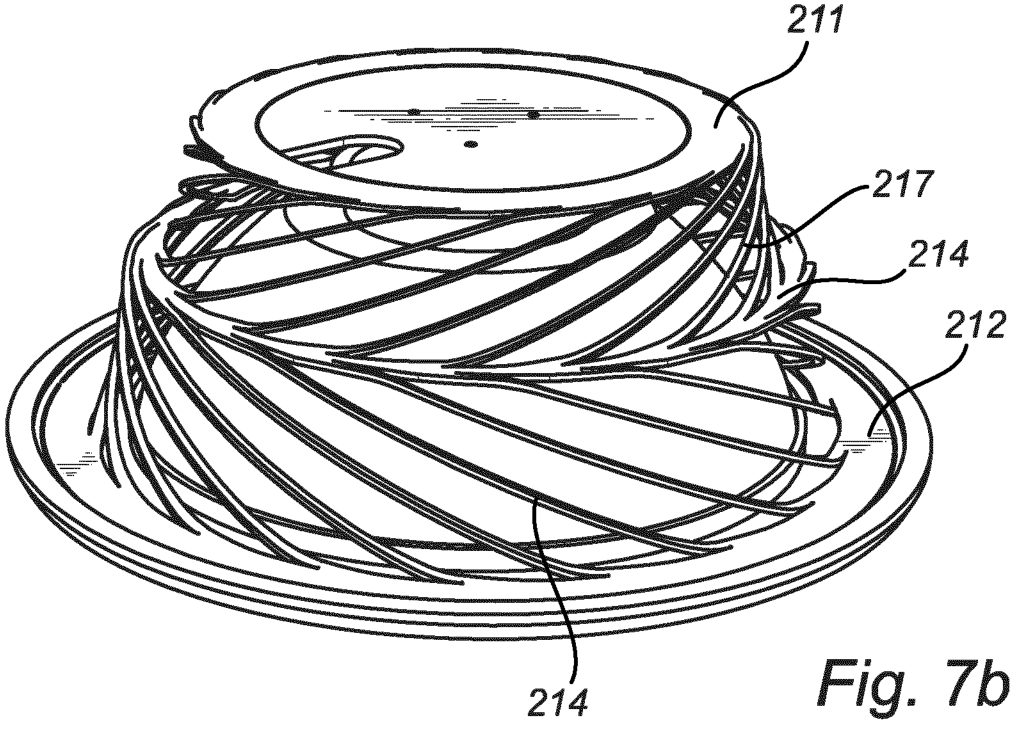
FIG. 7*b* shows a perspective view of luminaire assembly with the clamping element in FIG. 7*a*.

Another way to avoid rotation is shown in FIGS. 7*a-b*. The clamping element 200 in FIG. 7*a* again has an inner section 211, a peripheral section 212, and a first spiral shaped flexure section 213 with flexure elements 214. In this case, however, the clamping element 200 also has an intermediate section 215 and a second spiral shaped flexure section 216 with flexure elements 217. The two spiral shaped flexure sections 213, 216 are oriented oppositely, such that their rotational effect will cancel if they are both expanded. It is noted that the sections 213, 215 and 216 together make out an intermediate flexure section bridging the inner section 211 and the peripheral section 212.

FIG. 7*b* shows the clamping element in FIG. 7*a* in expanded state. Just as in FIG. 5, the peripheral section 212 is attached to the front rim 23, while the inner section presses on the heat sink 22. In between these sections are the two spiral shaped flexure sections 213, 216—both in expanded state- and the intermediate section 215.

It is noted that the clamping element in FIG. 7*a* may have additional advantages. For example, it may be applied such that only one of the flexure sections 213, 216 is expanded. This means that one single clamping element may be used for different applications (e.g. different clamping height). Further, the intermediate section 215 may be used to apply a second clamping force, i.e. one single clamping element may provide multi-level clamping.

Figure 8A:
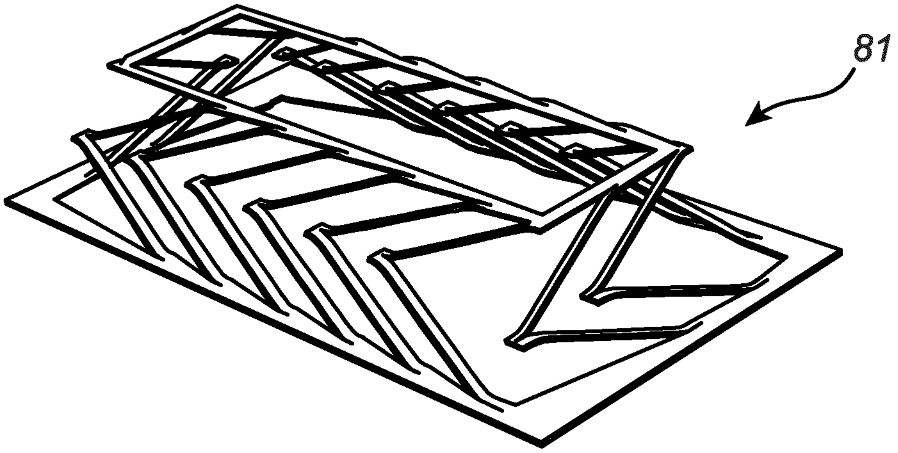
FIGS. 8*a-c* show various shapes of clamping elements according to embodiments of the present invention.
Figure 8B:
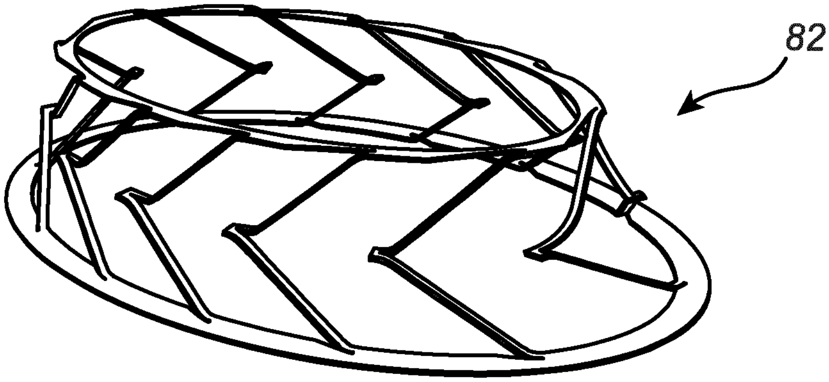
Figure 8C:
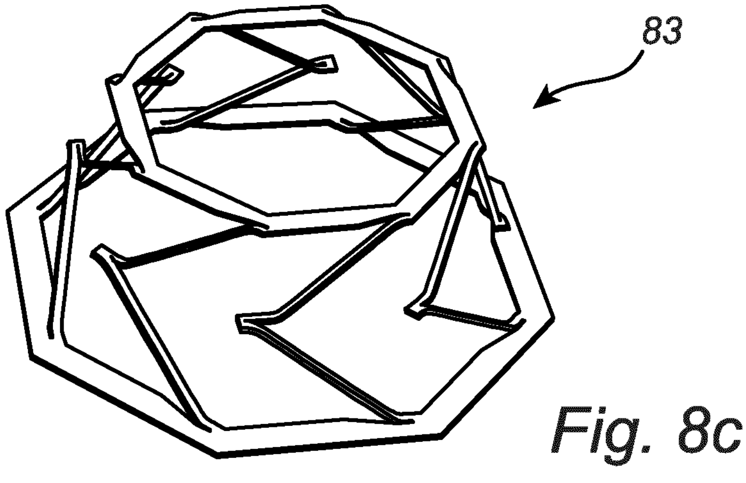

It is noted that although the clamping elements 10, 100, 200 in FIGS. 3-7 are all circular, this is not a necessary requirement. On the contrary, many other geometries are possible, and FIGS. 8*a-c* illustrate a few of them. In FIG. 8*a*, the clamping element 81 is rectangular, configured to fit with an elongated, rectangular stack of a luminaire. In FIG. 8*b*, the clamping element 82 is oval, configured to fit with an oval stack of a luminaire. In FIG. 8*c*, the clamping element 83 is octagonal, configured to fit with an octagonal stack of a luminaire. In all examples, the annular flexure section has substantially the same width all around, to ensure an equal—or close to equal—clamping force all around.

The person skilled in the art realizes that the present invention by no means is limited to the preferred embodiments described above. On the contrary, many modifications and variations are possible within the scope of the appended claims. For example, a clamping element according to the present invention may in principle be formed by forming a flexure section in an existing (rigid) clamping element.

The invention claimed is:

1. A luminaire assembly comprising:

a set of components arranged in a stack along a central axis, and a clamping element for clamping the stack of components in a luminaire assembly, the clamping element comprising:

an inner section;

a peripheral section, co-planar with and surrounding the inner section; and an annular flexure section bridging the inner section and the peripheral section, said annular flexure structure allowing an elastic displacement of the inner section with respect to the peripheral section in a direction normal to a planar extension of the peripheral section, such that, when the inner section is separated from the peripheral section in said direction, the flexure section causes a clamping force between the inner and peripheral sections, wherein the inner section abuts an outer component in a back end of the stack and the peripheral section is attached to an outer component in a front end of the stack, such that said components are sandwiched between the inner and outer ring sections and are clamped by the clamping force.

2. The luminaire assembly according to claim 1, wherein the annular flexure section is circular.

3. The luminaire assembly according to claim 1, wherein the annular flexure section includes a set of spirally arranged flexible elements.

4. The luminaire assembly according to claim 1, wherein the annular flexure section includes a set of zig-zag shaped flexure elements, each comprising two legs with opposite orientation.

5. The luminaire assembly according to claims 1, wherein the inner section is ring-shaped.

6. The luminaire assembly according to claims 1, wherein the peripheral section is ring-shaped.

7. The luminaire assembly according to claims 1, wherein an outer edge of the peripheral section is provided with a snap-fit structure, configured to be snap-fitted to an outer component of a stack of components.

8. The luminaire assembly according to claims 1, wherein the inner section, the peripheral section, and the annular flexure section have all been formed as separate parts, which parts have been assembled to form the clamping element.

9. The luminaire assembly according to claim 1, formed as a flat element made of one integral piece.

10. The luminaire assembly according to claim 9, wherein the flat element has been formed from a sheet material, such as sheet metal or plastic.

11. The luminaire assembly according to claim 9, wherein the flat element has been 3D-printed.

12. The luminaire assembly according to claims 1, wherein the annular flexure section includes a first annular flexure section and a second annular flexure section oriented oppositely to the first annular flexure section, and an intermediate section between said first and second annular flexure sections.

13. The luminaire assembly according to claim 1, wherein the set of components includes a heat sink, a reflector and a front side rim, and wherein the peripheral section is attached to said front side rim.

14. The luminaire assembly according to claim 13, wherein the front side rim comprises a snap-fit structure, and the peripheral section is snap-fitted into the front side rim.

15. A clamping element suitable for use in the luminaire assembly, wherein the clamping element comprises:

an inner section;

a peripheral section, co-planar with and surrounding the inner section; and an annular flexure section bridging the inner section and the peripheral section, said annular flexure structure allowing an elastic displacement of the inner section with respect to the peripheral section in a direction normal to a planar extension of the peripheral section, such that, when the inner section is separated from the peripheral section in said direction, the flexure section causes a clamping force between the inner and peripheral sections, wherein the annular flexure section includes a set of zig-zag shaped flexure elements, each comprising two legs with opposite orientation, or wherein the annular flexure section includes a first annular flexure section and a second annular flexure section oriented oppositely to the first annular flexure section, and an intermediate section between said first and second annular flexure sections.

* * * * *